Dec. 20, 1960 P. C. SHERBURNE ET AL 2,965,343
MOTOR ACTUATED PIPE HANGER AND POSITIONER
Filed April 13, 1959 6 Sheets-Sheet 1

INVENTORS
PHILIP C. SHERBURNE
ALFRED ZOLLINGER
BY
*David D. McKenney*
ATTORNEY

INVENTORS
PHILIP C. SHERBURNE
ALFRED ZOLLINGER
BY
David D. McKenney
ATTORNEY

INVENTORS
PHILIP C. SHERBURNE
ALFRED ZOLLINGER
BY
ATTORNEY

Dec. 20, 1960    P. C. SHERBURNE ET AL    2,965,343
MOTOR ACTUATED PIPE HANGER AND POSITIONER
Filed April 13, 1959    6 Sheets-Sheet 6

FIG. 8

INVENTORS
PHILIP C. SHERBURNE
ALFRED ZOLLINGER
BY
David D. McKenney
ATTORNEY

United States Patent Office 2,965,343
Patented Dec. 20, 1960

2,965,343

MOTOR ACTUATED PIPE HANGER AND POSITIONER

Philip C. Sherburne, Rumford, and Alfred Zollinger, Providence, R.I., assignors to Grinnell Corporation, Providence, R.I., a corporation of Delaware Filed Apr. 13, 1959, Ser. No. 806,040

22 Claims. (Cl. 248—58)

This invention relates to motor actuated constant support pipe hanger devices and to related pipe positioning devices. More particularly it concerns a method and arrangement of parts for determining the operability of such devices whenever desired. The method involves simulation of temperature-caused pipe movement by the device or its controls and indication of correction for such movement, and the arrangement includes apparatus at the device or at a remote point, or both, for simulating temperature-caused pipe movement and further includes signalling apparatus at the device or at a remote point or both, responsive to the simulated movement or lack thereof, to the desired corrective operation of the device or to its failure to so operate properly for indicating any of these conditions. It also relates to an arrangement in which the amount of simulated movement is limited so that the force exerted on the pipe to simulate temperature-caused pipe movement or to correct for such a simulated movement does not depart to too great an extent from the force which would be exerted in normal operation of the device. It also relates to an arrangement for preventing vibrations in the supported load or in the building structure from disturbing operation of the hanger and positioning devices.

Prior to the introduction of motors in constant support hangers springs were used. When such constant support spring hangers were first introduced no provision was made for testing their operability from time to time while they were in use. In fact these spring devices do not readily lend themselves to such testing. The advent of motor actuated constant supporting hangers has introduced a new concept in force exerting devices for supporting and positioning pipe, and the present invention has to do with the discovery that these new devices are well suited to testing, particularly in the novel manner hereinafter set forth.

When any constant support hanger is installed it is desirable to be able to determine at any time whether it is in operating condition. It is particularly important to know that the hanger is operative prior to warming up or cooling down the pipe system because it is during these temperature changes that the parts of the hanger must move the most, and if the hanger is found inoperative before the warming up or cooling down is begun it can be repaired while the pipes are stationary or nearly so.

The motor actuated constant support hangers and related motor actuated positioning devices are well suited to this testing because it has been found that by combining certain new apparatus with the motor, jack and switching components normally employed the device can be made to perform, in addition to its normal functions, the testing of these normal functions.

Considering the motor actuated constant support hangers first, normal operation is essentially a follow-up operation. For example when the pipe load is not moving the hanger parts do not move and the hanger exerts on the load an upward supporting force of a predetermined value. When the load moves down certain of the hanger parts are moved by the motor to follow the load while maintaining substantially the same upward supporting force, and when the load moves up these parts are moved by the motor to again follow the load while maintaining substantially the same upward supporting force. The hanger parts referred to are moved by the motor in response to slight changes in the force exerted on the hanger by the load. Thus when the load first begins to move down the movable hanger parts are stationary and accordingly the force exerted by the load on the hanger begins to exceed the predetermined value. When this increase has continued to a certain point, for example to a point where the force equals 102% of the predetermined value, the motor is actuated to move the hanger parts down.

On the other hand when the load first begins to move up the motor is actuated when the force decreases to a certain point, for example to 98% of the predetermined value, to move the hanger parts up. In either direction of load movement the speed of the movable hanger parts exceeds that of the moving load, so that the force is quickly returned to the predetermined value, whereupon the motor is turned off.

As described above the normal function of the motor actuated hanger is to follow, or more accurately, overtake load movements arising from piping temperature changes. To test such a hanger it would be expensive to install separate force exerting devices engaging and moving the pipe to simulate temperature-caused movement. It has been found, however, that the motor controls may be operated abnormally for a limited time to produce a force which when the abnormal operation is ended and the hanger returned to normal operation appears to the hanger as a temperature-caused load movement. The hanger then, if it is operable, operates normally to "follow-up" the simulated temperature-caused load movement, and suitable signals indicate to the tester that this has taken place.

More particularly, assume that it is desired to test the hanger to determine if it is operable for following a temperature-caused downward load movement. Further assume that at the time of the test the load is stationary. In accordance with one form of the present invention the test is begun by closing special circuits which actuate the motor in a direction to move the movable hanger parts upwardly. This has the same effect on the hanger as a downward temperature-caused pipe movement in that it increases the supporting force above the predetermined value. By continuing this abnormal operation until the supporting force exceeds a certain amount, for example, 102% of the predetermined value, and then by stopping the abnormal operation and returning the hanger to normal operation, a downward temperature-caused load movement has been simulated and the motor will be turned on in the opposite direction to move the movable hanger parts down again to the positions they were in when the test began. Signalling lights may be employed to indicate that the hanger parts were in fact moved to simulate a temperature-caused pipe movement and were returned to their original positions. The procedure is similar for testing the ability of the hanger to follow a temperature-caused upward load movement. The abnormal operation in the case produces the simulated load movement by moving the movable hanger parts down.

As to motor actuated pipe positioners, these are devices which force the pipe into a predetermined position in response to pipe temperature or in response to pipe movement at a point remote from the device. The pipe position is correlated to the temperature or movement so that for each temperature or movement there is a position to which the device moves the portion of the pipe it engages. The force exerted by a device of this kind is usually not constant, and the device differs from a constant support device in this respect.

In the normal operation of a motor actuated pipe positioner the temperature or movement at a remote point to which the device responds moves a switch armature in one direction until a switch is closed. This switch turns on the motor to exert force on the pipe and move the pipe. The same (or another) switch armature and switch are so arranged that the pipe movement thus produced at the positioner moves the last-mentioned switch armature in a direction to open the last-mentioned switch and turn off the motor. Thus, like the motor actuated constant support hangers, the motor actuated pipe positioner is essentially a follow-up device, but instead of following the temperature caused movement of the load at the device it follows an armature actuated by some change in temperature in the pipe system or by some movement in the system remote from the load.

As in the case of the motor actuated constant support hanger the present invention applied to a motor actuated pipe positioner involves the discovery that by abnormally operating the device or its pipe condition responsive controls, a temperature change or pipe movement at a remote point can be simulated and upon return to normal operation the motor will turn on in a direction to remove this simulated temperature change or pipe movement.

Accordingly it is one object of the present invention to provide a novel method of testing the operability of a motor actuated pipe hanger or pipe positioner by simulating a change to which the device normally responds.

Another object is to provide a novel method for testing a motor actuated pipe hanger device or pipe positioner device involving operating the motor in one direction independently of any temperature caused pipe condition change and independently of the pipe condition responsive controls to simulate the effect on these controls of one change in the pipe condition, and operating the motor in the opposite direction in response to the simulated effect on these controls.

Another object is to provide a novel method for testing a motor actuated pipe hanger device or pipe positioner device involving operating the pipe condition responsive controls in one direction independently of any temperature caused pipe condition change to simulate the effect on the motor of one such change in the pipe condition, and operating these controls in the opposite direction independently of any temperature caused condition change to simulate the effect on the motor of an opposite change in the pipe condition.

Another object is to provide a novel method for testing the devices referred to involving operating the motor independently of any temperature caused pipe condition change to move the pipe in one direction, turning off the motor when such pipe movement reaches a predetermined amount, turning on the motor to move the pipe in the opposite direction by substantially said amount, and signalling both of these motor operations.

Another object is to provide a motor actuated constant support pipe hanger or a motor actuated pipe positioner wherein in addition to a motor switch actuated by temperature caused pipe condition changes there is another motor switch for turning on the motor independently of any temperature caused pipe condition change to move the pipe to simulate such a temperature caused pipe condition change and wherein said first mentioned switch restores the device to normal operation and returns the pipe to its original position after the simulated change has reached a certain magnitude.

Another object is to provide a motor actuated pipe hanger or positioner wherein in addition to a motor switch actuated by temperature caused pipe condition changes there is another motor switch for turning on the motor in one direction independently of any temperature caused pipe condition change to move the pipe to simulate such a change in the condition of the pipe and for turning off the motor after the simulated change has reached the certain magnitude, and wherein said first-mentioned switch turns the motor on in the opposite direction to return the pipe to its original position to remove said simulated change.

Another object is to provide a motor actuated pipe hanger or pipe positioner wherein in addition to a motor switch actuated by temperature caused pipe condition changes there is another switch for turning on the motor independently of any temperature caused pipe condition change and in a direction to move the pipe to simulate such a pipe condition change, and wherein the first-mentioned switch automatically turns the motor off after the simulated change has reached a predetermined magnitude, automatically turns the motor on in the opposite direction to move the pipe to remove the simulated change and automatically turns the motor off when said simulated change is removed.

Another object is to provide a testing arrangement for motor actuated constant support pipe hangers and motor actuated pipe positioners in which the additional switch for initiating the tests and the signalling equipment for indicating the operation are located at a point remote from the hanger.

Another object is to provide a testing arrangement for motor actuated hangers and positioners in which vibrations of the pipe or building structure do not interfere with the operation of the device.

Other objects will appear hereinafter.

The accompanying drawings show and the specification describes preferred embodiments of the present invention. It will be understood, however, that these are merely illustrative for it is intended that the patent cover by suitable expression in the appended claims whatever of patentable novelty exists therein.

Figures 1, 4:
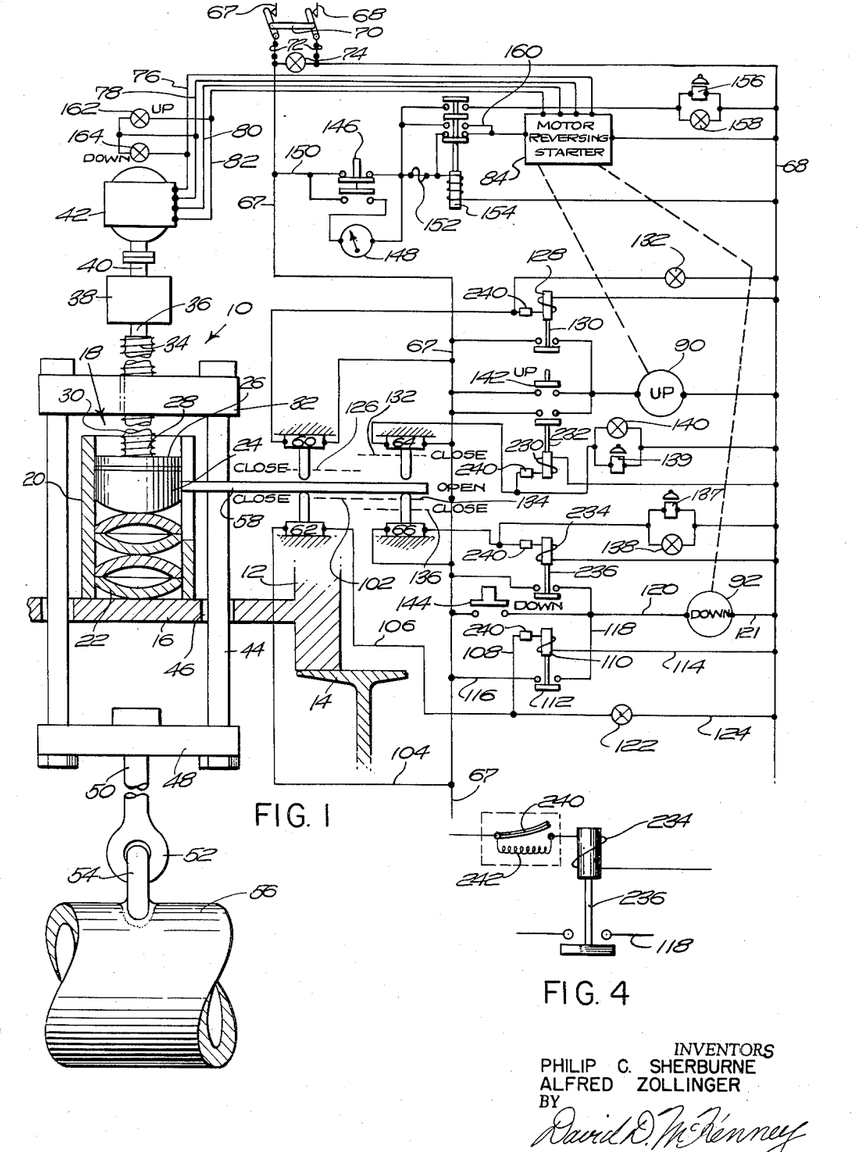
Figure 1 is a diagrammatic side elevation view of a motor operated constant support hanger and a circuit diagram of one embodiment of the present invention.
Figure 4 is a detail of the time delay switch mechanism shown in Fig. 1.

Referring now to Fig. 1 of the drawings the numeral 10 indicates generally a diagrammatic showing of a motor actuated constant support pipe hanger having a frame 12 adapted to be secured to some fixed structure such as a building frame 14. Resting on a substantially horizontal plate 16 of this frame is a load cell 18 having a cylindrical casing 20 with springs 22 and a piston 24 therein. A thrust bearing 26 on top of the piston rotatably supports the lower end 28 of a vertically disposed screw member 30, which has a nut member 32 threaded thereon and has its upper end 34 coupled to the output shaft 36 of a speed reducing unit 38, the input shaft 40 of which is coupled to and driven by a motor 42. Rods 44, the upper ends of which are fastened to the nut member 32, extend downwardly and slidably through openings 46 in the frame plate 16 and have their lower ends secured to a yoke member 48 to the center of which there is secured a single load supporting rod 50 with its lower end 52 engaging a bracket 54 welded to the pipe load 56. The load cell piston 24 is provided with a horizontally extending switch armature 58 which is arranged to operate switches 60, 62, 64 and 66 in a manner which will be explained.

The electric power is supplied to the motor 42 by being first brought to the circuit on leads 67 and 68 in which there is located a double pole switch 70. A fuse 72 and a light 74 (to show that a potential exists between 67 and 68) are employed in the usual way.

The motor 42 is supplied through four leads 76, 78, 80 and 82 from a motor reversing starter 84. This starter is shown in greater detail in Fig. 8. For Fig. 1 it suffices to point out that there are relays in the starter which selectively effect connections of the motor armature and field coils across the supply leads 67 and 68. The motor 42 turns in one direction or the other depending on which motor leads are connected to the supply leads. These motor reversing starter relays are actuated by starter coils 90 and 92. Energizing coil 90 actuates a starter relay which turns on the motor 42 to raise the nut member 32, while energizing coil 92 actuates a starter relay which turns the motor on to lower the nut member 32.

The remainder of the circuit is best described in conjunction with an explanation of its various modes of operation. For example, assume that the pipe line is cooling off and that the pipe load 56 is therefore moving down. The armature 58 is located with respect to the four switches 60, 62, 64 and 66 so that each of these switches is open, and accordingly, motor 42 is off and nut member 32 is not moving along the screw member.

In this state of affairs downward motion of the load 56 causes a compression of the load cell springs 22 moving the armature 58 downwardly. The dotted line 102 indicates the position of the armature 58 when the switch 62 is closed. This closing of switch 62 completes the following circuit between lines 67 and 68: line 67, line 104, switch 62, line 106, line 108, the windings 110 of a relay switch 112, line 114 to line 68. Energizing the windings 110 of the relay switch 112 closes this switch and completes another circuit from the line 67 through a line 116, switch 112, line 118, line 120, Down coil 92 of the motor reversing starter, line 121 and line 68. This turns on the motor 42 in a direction to drive the nut 32 downwardly which relieves the force exerted by the downward motion of the load on the load cell with the result that the armature 58 moves upwardly away from the dotted position 102 to the solid position where switch 62 opens. The opening of this switch 62 stops the flow of current through the windings 110 of the relay switch 112 so that this switch opens and stops the flow of current through the Down coil 92 of the motor reversing starter. This shuts off the motor 42. The closing of switch 62 is visually indicated by a lamp 122 energized by the closing of switch 62 through a line 124 connecting line 106 to line 68.

If the opposite motion of the load occurs, that is an upward movement due to changes in the temperature of the piping system, the armature 58 moves upwardly inasmuch as upward load movement lifts some of the load force from the springs 22 in the load cell. When the armature 58 reaches a position indicated by the dotted line 126 the switch 60 is closed completing a circuit from the line 67 through this switch 60 and through the windings 128 of a relay switch 130 to line 68. Another circuit is also completed from line 67 through the switch 60 and through a lamp 132 to the line 68. Lighting of this lamp indicates the closure of switch 60. Energizing of the windings 128 closes relay switch 130 and completes a circuit from the line 67 through the Up coil 90 of the motor reversing starter to the line 68. This latter circuit turns on the motor 42 in a direction to move the nut member 32 upwardly which movement picks up more load and compresses the load cell springs 22 thereby moving the armature 58 downwardly again, and when this armature has returned to the position shown in solid lines switch 60 opens, turning off the lamp 132 and de- energizing the Up coil of the motor reversing starter. This turns off the motor 42.

Thus in the normal operation of the hanger movements of the load 56 are detected and the movable hanger parts are moved to follow these load movements while maintaining on the load a support which only varies from the desired value by the amount of deflection in the springs 22 as the armature moves between the dotted armature positions 102 and 126. As a practical matter these dotted positions can be set so that the variation in supporting effect during load movement is as little as 2% of the weight of the load. Switches 64 and 66 are provided as a safety feature in case the switches 60 and 62 fail to operate. In that event the switches 64 and 66 will control the motor. Switch 64 does not close until the upwardly moving armature 58 has reached the dotted position 132 which represents a larger movement than was necessary to close the switch 60, and similarly switch 66 is not closed until the downwardly moving armature 58 reaches a dotted position 136 which represents a larger movement of the armature than was necessary to close switch 62. The circuits employed for switches 64 and 66 are otherwise the same, except that bells 137 and 139 are employed with switches 66 and 64 in addition to lamps 138 and 140. These bell and lamp combinations call attention to the fact that one of the normal switches 60 and 62 has failed to operate and that the device requires repair.

The testing procedure for this arrangement of Fig. 1 is as follows. A button switch 142 when closed completes a circuit between the lines 67 and 68 through the Up coil 90 of the motor reversing starter 84. Thus even if the armature 58 is in the position shown in solid lines, with switches 60, 62, 64 and 66 all open, depressing the button switch 142 turns on the motor 42 to drive the nut member 32 upwardly. The effect of this on the load cell is identical to a downward motion of the load 56 in that the springs 22 in the load cell are further compressed, thereby moving the armature 58 downwardly. As long as the button switch 142 is held closed the motor 42 continues to operate in this fashion. When the armature 58 reaches the position indicated by dotted line 102 this completes a circuit as previously described which energizes the Down coil 92 of the motor reversing starter. However, the motor reversing starter is so constructed and arranged that as long as the Up coil 90 is energized to turn on the motor 42 in a direction to move the nut member 32 upwardly, energization of the Down coil 92 has no effect on this motor operation, and it is not until the Up coil 90 is de-energized that the energization of the Down coil 92 can have its effect.

The closing of switch 62 is indicated to the tester by the lighting of lamp 122 and if he holds the button switch 142 closed until the armature 58 closes the switch 66 he will also observe the lighting of lamp 138 and ringing of bell 137. These signals inform the tester that the circuits of switches 62 and 66 are functioning properly and that a certain oversupport has been exerted on the load by the test, namely a force sufficient to compress the load cell springs 22 until armature 58 closes switch 66. Continuing the test does not provide the tester with any further information and endangers the pipe line so at this point the tester permits button switch 142 to open. This immediately de-energizes the Up coil 90 of the motor reversing starter which, as previously mentioned, enables the energization of the Down coil 92 to have its effect and the motor reversing starter immediately operates to turn on the motor in a direction to move the nut member 32 downwardly. This causes the armature 58 to begin to rise, and when the switch 66 opens, at dotted line 134 the lamp 138 goes out and bell 137 stops ringing. However, the motor operation continues because the switch 62 is still closed and it is not until the armature 58 returns to the position shown in solid lines that the motor 42 stops. At this same time the lamp 122 goes out.

Thus the test indicates whether the circuits are in operating condition, more particularly whether they are able to turn on the motor to deal with a condition which appears to the hanger to be an increase in load. If closing of the Up button switch 142 does not result in a lighting of lamp 122 and a subsequent operation of the lamp and bell combination 138—137 or if they turn on as expected but after opening of the button 142 they do not turn off in the manner above-described the tester also knows that there is a fault. He will then proceed to have the necessary repairs made.

A temperature caused upward movement of the load 56 can be simulated in the hanger by pushing Down button switch 144. This completes a circuit energizing the Down coil 92 of the motor reversing starter which turns on the motor 42 to drive the nut member 32 downwardly. Assuming that the load 56 was in fact stationary just prior to the closing of button switch 144, this downward motion of the nut member 32 has the effect of decreasing the upward force exerted on the load by the hanger which in turn results in an upward movement of the load cell armature 58. This closes switch 60 to turn on lamp 132 and subsequently closes switch 64 to turn on lamp-bell combination 140—139. When the latter has operated the tester knows that the nut member has been moved downwardly far enough to decrease by a certain amount the upward force exerted on the load and if he then permits the Down button switch 144 to open the energization of the Up coil 90 of the motor reversing starter (which energization resulted from the closing of switches 60 and 64) takes effect upon the de-energization of the Down coil 92, and the motor 42 is turned on in a direction to move the nut member 32 upward. This causes the hanger to pick up the weight of the load 56 previously released, and upward motion of nut member 32 continues until the armature moves down to the solid line position shown. The tester then knows that the hanger has operated properly to simulate a temperature-caused pipe movement and has also operated properly after this simulated movement has been produced to restore the supporting effect to the predetermined value.

In the circuit of Fig. 1 it is not necessary to keep the Up button switch 142 or the Down button switch 144 closed until the switches 66 or 64 are closed. A test can be conducted of switches 60 and 62 by releasing the button switch 142 or 144 after lamps 122 or 132 indicate that switches 62 or 60 have closed. This will test the operability of the motor 42 and motor reversing starter as well as the switches 60 or 62 and associated circuits. It will not test the operability of switches 64 or 66.

A "make before break" push button switch 146 in parallel with an ammeter 148 is provided in the motor reversing starter circuit between the leads 67 and 68 to test the amount of current drawn by the motor. Thus if the nut member 32 is jammed on the screw member 34 and there is higher than normal resistance between these moving parts the motor 42 will draw more current. By opening button switch 146 the current supplied to the motor 42 through line 150 is shunted through the ammeter 148 and an increase in this current above normal indicates unusual friction in the moving hanger parts. A fuse 152 is also provided so that if the current in line 150 exceeds a safe value this fuse will burn out. This will de-energize a solenoid relay 154 and complete a circuit to a bell 156 and light giving an indication that the fuse has blown out. This will not interrupt current to the motor, however, because the deactuation of solenoid relay 154 also closes a by-pass circuit 160 around the fuse 152.

Lights 162 and 164 in the lines from the motor reversing starter 84 to the motor 42 indicate that the motor is getting current and the direction in which the motor is turning, light 162 indicating that the motor is turning to move the nut member 32 up and light 164 indicating that the motor is turning to move the nut member down.

Figure 2:
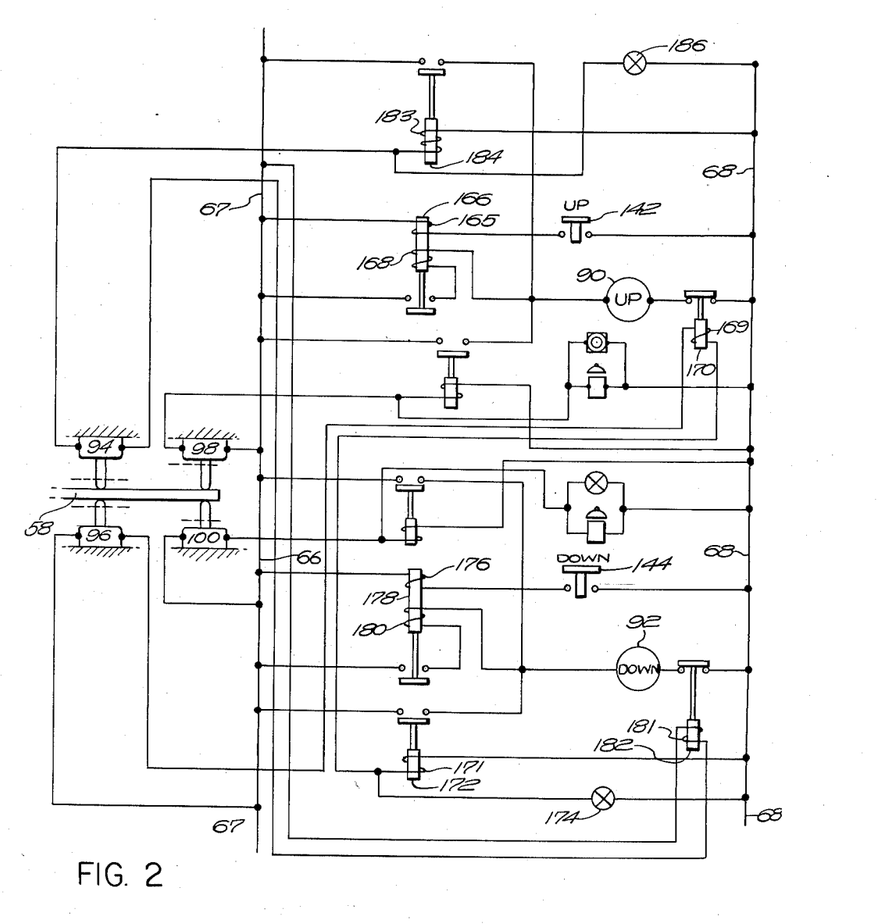
Figure 2 is a view like the circuit diagram of Fig. 1, but showing another embodiment of the invention.

Fig. 2 is a circuit somewhat similar to Fig. 1 but in which the showing of the hanger and the portions of the circuit at the motor reversing starter have been omitted inasmuch as they are identical to the arrangement in Fig. 1. For the circuit of Fig. 2 the arrangement is such that the tester does not have to maintain the button switches 142 or 144 closed in order to continue the simulation of a temperature caused pipe movement. Instead it is merely necessary for the tester to momentarily close these button switches and the testing from this point on is automatic. Thus, for example, assume that the tester pushes the Up button 142. This completes a circuit between the line 67 and line 68 and energizes the windings 165 of a self-energizing relay switch 166. This closes the switch contacts which energize additional windings 168 and completes a circuit through the Up coil 90 of the motor reversing starter. The tester can remove his finger from the button switch 142 immediately after this switch is closed because of the self-energization feature of the relay switch 166. The energization of the Up coil 90 of the motor reversing starter turns on the motor 42 (see Fig. 1) in a direction to move the nut member 32 upwardly and increases the force exerted on the load 56. This further compresses the load cell springs 22 and moves the load cell armature 58 downwardly closing first switch 96 and then switch 100. Closing switch 96 completes a circuit from line 67 through switch 96, then to the windings 169 of a relay switch 170 in series with the Up coil 90 of the motor reversing starter, then through the windings 171 of a relay switch 172 to the line 68. This also completes a circuit through a lamp 174 to line 68. Energizing windings 169 of relay switch 170 de-energizes the Up coil 90 of the motor reversing starter, turning off the motor 42. At the same time it energizes the windings 171 of the relay switch 172 which completes a circuit energizing the Down coil 92 of the motor reversing starter. This turns the motor 42 on again in the opposite direction to move the nut member downwardly; and this latter motor operation continues until the switch 96 is again opened at which point the armature 58 has been returned to the solid line position shown in Fig. 2.

The circuit of Fig. 2 above-described provides an automatic test in which the duration of the abnormal operation is controlled not by the length of time that the button switches are maintained closed by the tester, as in Fig. 1, but by the same switches employed in normal hanger operation.

The testing procedure and circuits for simulating a temperature-caused Up movement of the pipe are similar to the procedure and circuits above-described. When the tester momentarily closes the Down button 144 he completes a circuit between the lines 67 and 68 through the windings 176 of a self-energizing relay switch 178. This switch is then closed by the windings 180, completing a circuit through the Down coil 92 of the motor reversing starter. This turns on the motor 42 to drive the nut member 32 downwardly simulating a temperature-caused upward movement of the pipe, and this motor operation continues until the load cell armature 58 has risen to the point at which switch 94 is closed. This completes a circuit from line 67 through the windings 181 of a relay switch 182, the switch 94, the windings 183 of a relay switch 184 and a lamp 186. The energization of the relay switch 182 de-energizes the Down coil 92 of the motor reversing starter and thus turns off the motor which had been operating to drive the nut member downwardly. The energization of windings 183 closes switch 184 and completes a circuit through the Up coil 90 of the motor reversing starter to turn the motor on in the opposite direction to move the nut member upwardly. In this case the switch 170 in series with the Up coil 90 is closed for the reason that the switch 96 is open.

Figure 3:
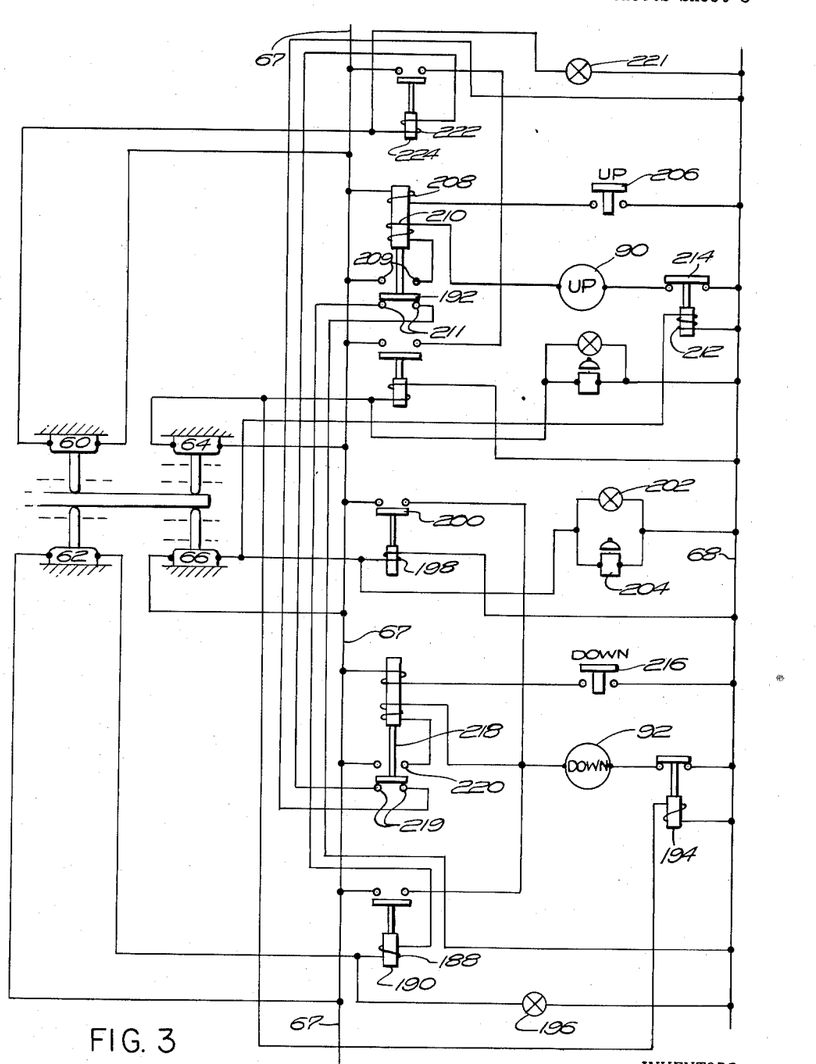
Figure 3 is a view like Fig. 2, but showing still another embodiment of the invention.

Referring now to Fig. 3 of the drawings, this shows still another circuit which can be employed with the hanger of Fig. 1.

The normal operation of Fig. 3 circuit is as follows.

Assume that the load 56 moves downwardly due to a temperature caused pipe movement. This moves the armature 58 downwardly to close switch 62 which completes a circuit from line 67 through switch 62, through the windings 188 of a relay switch 190, then through a switch 192 to the line 68. This closes switch 190 and energizes the Down coil 92 of the motor reversing starter, a switch 194 in series with this coil being closed. Energizing coil 92 turns on the motor 42 in a direction to move the nut member 32 downwardly which causes the armature 58 to rise and again open switch 62. A lamp 196 turns on when switch 62 is closed and turns off when switch 62 is open. If for any reason switch 62 should fail to operate when the load is moving downwardly switch 66 would close and complete a circuit from the line 67 through switch 66 and windings 198 of relay switch 200 to the line 68. This closes switch 200 and energizes the Down coil 92 of the motor reversing starter. At the same time closing of switch 66 would light a lamp 202 and ring a bell 204.

If the temperature-caused load movement is up instead of down the switches 60 and 64 operate in the same manner described with respect to switches 62 and 66.

Assume now that it is desired to test the hanger to determine if it is ready for operation. More particularly, assume that it is desired to determine whether the hanger is ready to take care of a temperature-caused downward movement of the pipe. The tester momentarily closes the button switch 206 which energizes one winding 208 of a relay switch 192. This energizing of winding 208 closes the back contacts 209 of switch 192 which maintains these contacts closed through a second winding 210. Closing these back contacts of switch 192 energizes the Up coil 90 of the motor reversing starter which turns on the motor to move the nut member 32 upwardly. This movement of the nut member causes the armature 58 to move down until it closes switch 62. This closing of switch 62 lights lamp 196 but does not energize the Down coil of the motor reversing starter because the front contacts 211 of the switch 192 are open. Accordingly, after switch 62 closes upward movement of the nut member 32 continues until the armature 58 closes switch 66. This completes a circuit which energizes the winding 198 of relay switch 200 and closes this switch which in turn energizes the Down coil 92 of the motor reversing starter. At the same time closing of switch 66 completes a circuit which energizes the windings 212 of a switch 214 in series with the Up coil 90 of the motor reversing starter and opens this switch. This opening of relay switch 214 de-energizes the Up coil 90 so that the energized Down coil 92 turns the motor 42 on in a direction to move the nut member 32 downwardly. Opening of relay switch 214 also caused relay switch 192 to be de-energized (assuming button switch 206 has been released) and the front contacts 211 of relay switch 192 are closed. Since switch 62 is still closed at this point the result is an energization of the windings 188 of switch 190 which completes another circuit to the Down coil 92. The closing of switch 66 resulted in a lighting of lamp 202 and ringing of bell 204. Since Down coil 92 is energized by both switches 62 and 66 downward movement of the nut member 32 continues until both of these switches are open which is to say when the armature 58 has returned to the position shown in solid lines in Fig. 3.

Thus from the foregoing it will be seen that the tester needs only to momentarily close button switch 206 to initiate a test which form that point on is automatic in that it indicates to him that the motor is running in one direction, that switch 62 has closed, that switch 66 has closed, that the motor has stopped, that the motor has turned on and is running in the opposite direction, and that switch 66 has opened, and finally that switch 62 opened.

Similarly the hanger can be tested with this circuit to determine if it is in condition to move the nut member 32 upwardly to follow a temperature caused upward pipe movement. Thus if button switch 216 is momentarily closed self-energizing relay switch 218 is energized to open the front contacts 219 and close the rear contacts 220. This energizes the Down coil 92 of the motor reversing starter and turns on the motor 42 to move the nut member 32 downwardly. This movement simulates the temperature caused upward pipe movement so that armature 58 moves upward to close switch 60. This lights a lamp 221 but since the front contacts 219 of relay switch 218 are open the windings 222 of relay switch 224 are not energized, and the Up coil 90 is not energized by the closing of switch 60.

Fig. 4 is a detail of the time delay switch 240 employed in series with relay switches 130, 232, 236 and 112 of Fig. 1. These time delay switches have heating coils 242 of high resistance passing a very small current which is unable to actuate the relays but which develops enough heat to close the switch after a certain time delay. The purpose of these time delay switches is to prevent rapid intermittent operation of the motor due to vibrations of the building or piping which would cause the armature 58 to rapidly open and close one of the switches 60, 62, 64 or 66. By using the time delay the relays are only actuated after the switches last-mentioned have been opened or closed for the predetermined length of time. A delay which has been found satisfactory is of the order of 10 seconds.

Figures 5, 6, 6A:
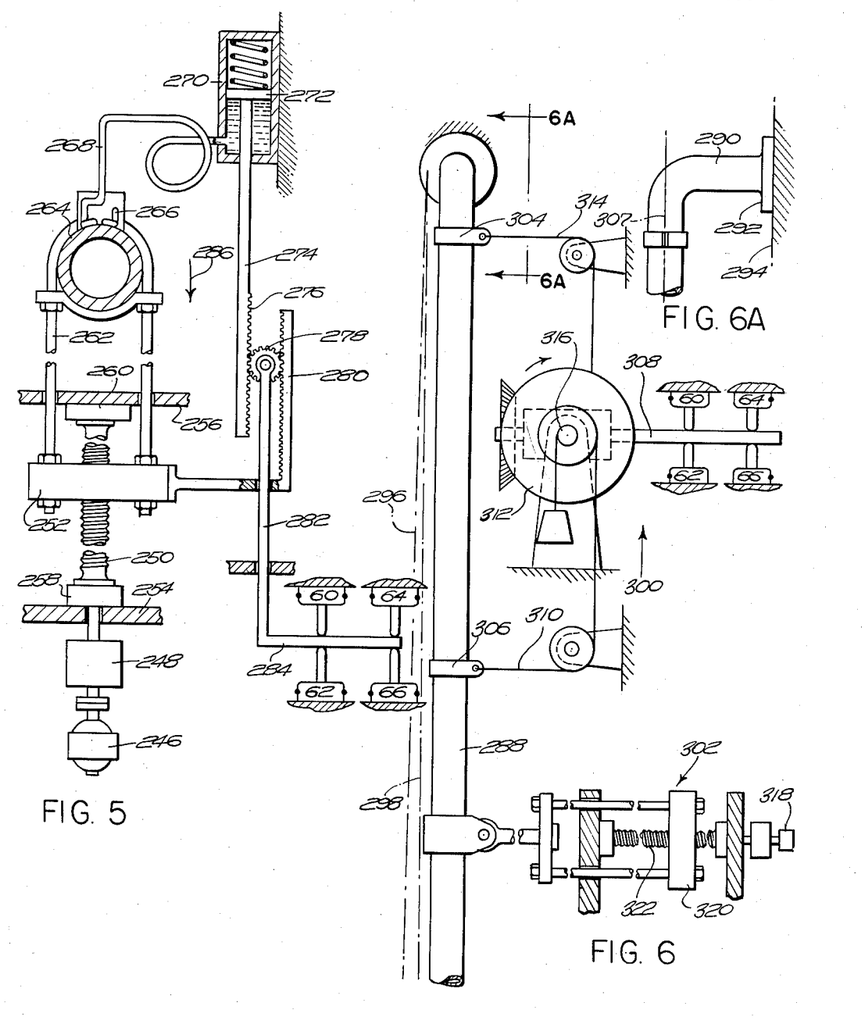
Figures 5, 6, 6a and 7 are diagrammatic views like that of Fig. 1, but showing three different motor actuated pipe positioners instead of a motor actuated constant support pipe hanger.
Figure 7:
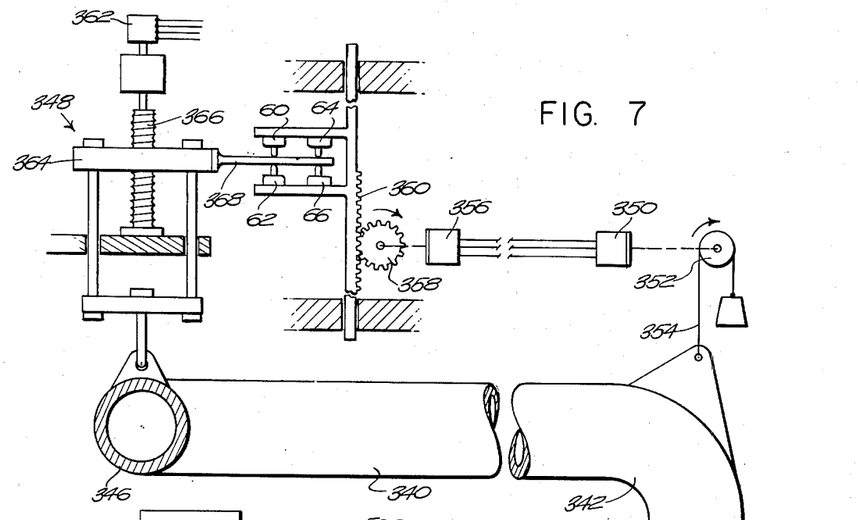

The circuits of Figs. 1 to 4 have been shown in connection with a motor operated constant support hanger such as that shown diagrammatically in Fig. 1. However there are other similar types of motor operated devices which respond to other signals than the change of load at the hanger itself. The present invention may be equally well employed with these other devices as with the hanger shown in Fig. 1. Figs. 5, 6 and 7 illustrative different types of such devices.

Fig. 5 shows a pipe positioner which is responsive to temperature at some point in the system either at the positioner or remote therefrom. The positioner is shown somewhat diagrammatically as comprising a motor 246 which drives reduction gear unit 248 which in turn drives a screw member 250 on which there is threaded a nut member 252. The screw member 250 is mounted for rotation between fixed frame plates 254 and 256 on thrust bearings 258 and 260. The nut member 252 has secured thereto the legs of a U-shaped connecting member 262 the center of which is secured to a pipe 264 which is to be positioned. A temperature sensing device 266 is located on the surface of the pipe 264, in this case at the U-bolt 262, and comprises a tube 268 distributed on the pipe surface and containing a liquid which expands and contracts with changes in temperature. The liquid extends through the tube 268 to a cylinder 270 containing a spring loaded piston 272. Expansion of the liquid which also fills the cylinder below the piston moves the piston 272 upwardly. The piston carries a piston rod 274 having teeth 276 therein in the form of a rack. The rack teeth mesh with a gear 278 which in turn meshes with a second toothed rack 280 secured to the nut member 252. A rod 282 is pivotally connected to the axle of the gear 278 and carries a switch armature 284.

The operation of this device is as follows. It has been determined in advance where the pipe 264 should be for each different temperature to which the pipe is heated. In this case it has been found that the pipe position should be substantially proportional to the movement of the piston 272 but in the opposite direction. For example, assume that the temperature of the pipe 264 increases from room temperature to 100°. The resulting upward movement of the piston 272 carries the rack 276 upwardly and rotates the gear 278 in a clockwise direction lifting the rod 282 and hence the armature 284. Assuming that a circuit like that of Fig. 1 is used this would move the armature 284 to close the switch 60 which would turn on the motor in a direction to move the nut member 252 toward the motor. This would pull the pipe 264 in the direction indicated by the arrow 286, and this motion of the nut member 252 would in turn move the rack 280 downwardly to return the gear 278 to its original position with respect to the switches. In other words the armature 284 is moved downwardly with respect to switch 60, and this motion of the armature 284 continues until the switch 60 is again open to de-energize the motor 246.

When the pipe 264 has reached its operating temperature which may be in the neighborhood of 1000° the pipe positioner of Fig. 5 will have drawn the pipe 264 downwardly step by step in the above described manner and by the amount predetermined to be proper for a 1000° temperature rise. The purpose of moving the pipe in this manner would be to relieve stresses at certain critical points in the pipe system which stresses would occur if the pipe were not forced into a predetermined position by a device such as that illustrated in Fig. 5.

The testing of the device of Fig. 5 is similar to the testing of the device of Fig. 5 is similar to the testing of the device shown in Fig. 1. A circuit such as that shown in Figs. 1, 2 or 3 may be employed. Thus, assume that the circuit of Fig. 1 is chosen. In that case the closing of the Up bottom switch 142 would turn on the motor 246 to move the nut member 252 toward this motor and thereby move the pipe 264 and rack 280 downwardly as shown in Fig. 5. This downward motion of rack 280 carries the armature 284 downwardly until switch 62 is closed. This is indicated by the lighting of lamp 122 whereupon the person conducting the test opens button switch 142 to stop the motor operation. The closed switch 62 has energized relay switch 112 which has energized the Down coil 92 of the motor reversing starter, and when the motor operation which is driving the nut member 252 down has stopped this energizing of the Down coil 92 turns on the motor 246 in the opposite direction to move the nut member 252 upwardly. This latter motor operation ceases when the upward motion of armature 284 opens switch 62.

Conversely, closing of the Down button switch 144 in the circuit of Fig. 1 turns on the motor to move the nut member 252 upwardly and to carry the armature 284 upwardly until switch 60 is closed. This lights lamp 132, whereupon the person conducting the test permits Down button switch 144 to open, and the closed switch 60 which has energized the Up coil 90 of the motor reversing starter turns on the motor 246 to move the nut member 252 downwardly. This motor operation continues until switch 60 is open and the pipe 264 is restored to the position it assumed prior to the test.

Here again the motor actuated unit is employed to test its own ability to operate. Instead of obtaining its actuation from the movement of rack 276 the gear 278, during a test, is moved out of its equilibrium position by movement of the rack 280 in one direction, and the circuit is arranged so that this rack is automatically returned to the same equilibrium position. In Fig. 1 this corresponds to the displacement of the armature 58 from its equilibrium position and its automatic return to that position in the test of the load sensitive device.

Fig. 6 shows another pipe positioning device which may be used in conjunction with the circuit of Figs. 1, 2 and 3. This device responds to changes in the orientation of a section of piping rather than to changes in load (as in Fig. 1) or temperature (as in Fig. 5). Thus in Fig. 6 a typical vertical section of piping 288 has its upper end turned horizontally at 290 and extending to a connection 292 on a piece of fluid handling equipment 294 such as a steam turbine. In normal operation and without a motor-actuated device the changes in temperature of the piping and of the turbine 294 are found to cause the axis vertical pipe section 288 to move out of the vertical to a position shown, for example, by the dot-dash line 296. At the same time it has been found that minimum stresses occur at the critical connection 292 if the pipe section 288 is maintained substantially vertical, as represented by the dot-dash line 298. The differential switch generally indicated at 300 controlling a force exerting device 302 through a circuit like that of Figs. 1, 2 or 3 will maintain the pipe section 288 substantially vertical for all temperatures. Thus, as long as vertically aligned points 304 and 306 on the pipe portion 288 move in unison in the plane 307 (see Fig. 6A) the armature 308 of the differential switch 300 will remain substantially horizontal and the switches 60 to 62 will remain open. If, however, the point 304 were to move to the left (in Fig. 6) with increases in temperature at a faster rate than the point 306 (which would be the case if the lower end of pipe section 288 were restrained by the motor-actuated device 302), the cable 310 connected at point 306 would rotate the gear 312 in a clockwise direction at a slower rate than the corresponding gear (not shown) would be moved in a counter-clockwise direction by the upper cable 314. As a result armature 308 would tip upwardly about its axis 316 and would close switch 60. This closing of switch 60 would turn on a motor 318 in the motor actuated unit 302 to drive the nut member 320 along the screw member 322 in a direction away from the motor 318. This would move the lower end of the section 288 in unison with the upper end connection 292.

The testing of this arrangement may be similar to that of the two previously described. Thus, the operability of the unit 302 may be determined by by-passing the switches 60, 62, 64 and 66 and turning on the motor to purposely improperly orient the section 288 a limited amount and by then permitting the normal operation of the differential switch to correct for this simulated temperature-caused pipe movement.

Fig. 7 is still another arrangement for controlling the movement of a pipe line with a motor operated device. In this case the objective is to maintain a length of pipe 340 horizontal when one end 342 is moved vertically by the thermal expansion and contraction of a vertical riser 344 and the other end 346 is restrained against vertical movement for one reason or another. A force exerting unit 348 is located at the end 346 of the length of pipe and receives its signals from the other end 342. The force exerting 348 is so controlled that the end 346 is moved in unison with the end 342. More particularly this is accomplished by a pair of selsyn units 350 and 356, the first of which is actuated by a pulley 352 rotated by a cable and weight arrangement 354 as the vertical riser 344 moves up and down with temperature changes. The other selsyn unit 356 drives a gear 358 engaging a rack 360 on which are mounted the switches 60 to 66. These switches control the motor 362 of the force exerting device 348. If the vertical riser 344 increases in length and rotates the pulley 352 clockwise the gear 358 is similarly rotated clockwise by means of the selsyns 350 and 356 to move the rack 360 upwardly. This closes switch 62 which turns on the motor 362 to move the nut member 364 upward on the screw member 366. The ratio of movement of the end 342 and switch armature 368 is in this case one to one so that the horizontal pipe section 340 remains horizontal regardless of the pipe temperature.

Here again the circuit of Figs. 1, 2 or 3 may be used to test the ability of this arrangement to operate by operating the motor 362 to simulate a temperature-caused pipe movement and by then permitting the normal operation of the arrangement to turn on the motor in the opposite direction and restore the pipe to its position before the test.

Figure 8:
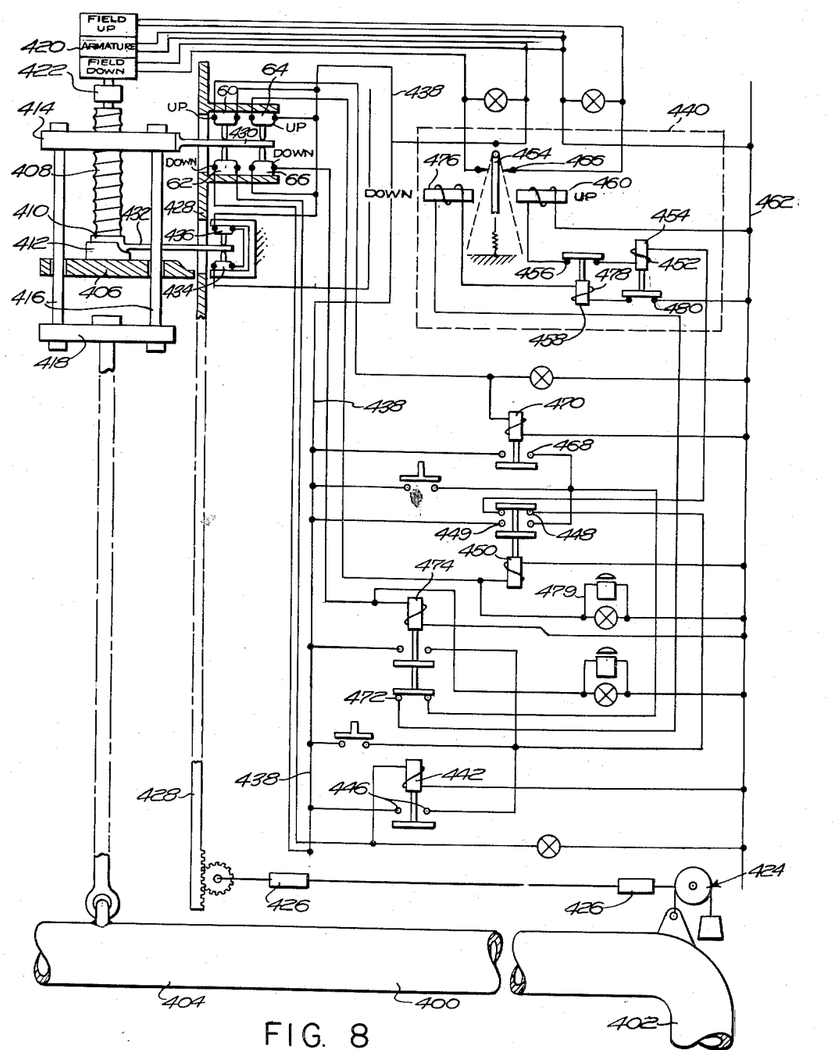
Figure 8 is a diagrammatic side elevation view of a motor actuated pipe positioner and a circuit diagram of another embodiment of the invention.

Fig. 8 shows another diagram and circuit embodying the present invention with additional safety features. Thus the circuit of this Fig. 8 is similar to that of Fig. 1, but with provision made for preventing run away operation in the event one of the switches should fuse closed and fail to open and also with provision made for deactivating the positioner in the case of an excessive under or over support.

The positioner shown is similar to that of Fig. 7 in that there is a horizontal section of pipe 400 which has a vertical riser 402 at one end and is supported at the other end 404 by a positioner comprising a frame 406, a screw member 408 rotatably mounted on the frame through a thrust bearing 410 and a load cell 412. A nut member 414 is threaded on the screw member, and rods 416 connected at their upper ends to the nut member 414 have their lower ends connected to a cross-bar 418 to the center of which the horizontal pipe section 404 is secured in a conventional manner as shown. A motor 420 rotates the screw member 408 through a reduction gear unit 422.

Vertical motion of the riser 402 is detected by the weight and pulley system 424, and a pair of selsyns 426 produces a similar motion in a rack 428 in the same manner as in Fig. 7. Also, as in Fig. 7, the rack 428 carries switches 60, 62, 64 and 66 which are actuated by an armature 430 connected to the nut member 414.

The load cell 412 is similar to the load cell 18 shown in Fig. 1 in that changes in the force exerted downwardly by the pipe end 404 on the nut member 414 and hence on the screw member 408 deflects springs (not shown) in this load cell and produces slight up and down motion of an armature 432 carried on the movable load cell portion. A pair of normally closed switches 434 and 436 are arranged in series with an electrical lead 438 supplying current to the motor 420. These switches 434 and 436 are set so that as long as the forces exerted on the positioner do not fall below or exceed predetermined limits, the lead 438 supplies current to the motor 420 through the motor reversing starter unit indicated by the mechanism included in the box 440.

The purpose of these overload and underload limit switches is to prevent excessive force from being exerted upwardly on the pipe end 404 and to prevent inadequate supporting force from being exerted upwardly on this pipe end. Thus these load limit switches are essentially a safety feature in the circuit.

In the circuits of Figs. 1, 2 and 3 no provision is made for preventing run away operation of the motor caused by the fusing of one of the switches 60 or 62. Thus in those three earlier circuits as long as either the Up or Down coil of the motor reversing starter is energized the other coil even if energized, is unable to stop the motor and turn it on in the opposite direction. More particularly, in Fig. 1 if the switch 62 fuses closed and will not open (even though armature 58 moves upward) down operation of the motor will continue even after switches 60 and 64 have closed.

In Fig. 8 if rack 428 moves up and closes switch 62 relay 442 closes and completes a circuit from power line 438 through the contacts 446 of relay 442, then through the contacts 448 of a relay 450, which contacts are normally closed, then through the windings 452 of a relay 454, then through the contacts 456 of a relay 458, which contacts are normally closed, then through the Up coil 460 to the other power line 462. This moves switch 464 against contact 466 to turn on the motor to drive the nut member 414 upwardly, and as long as switch 62 remains closed this upward motion of the motor will continue. Such upward motion causes the armature 430 to move upwardly relative to the rack 428 and in normal operation switch 62 should open when the relative positions of the rack and armature are again as shown in Fig. 8. However, if switch 62 is stuck closed and fails to open upward motion of the armature 430 will continue and close switch 60. As in the case of the circuit of Fig. 1, closing of this switch 60 is unable to arrest the upward operation of the motor because the circuit from lead 438 through the contacts 468 (which are closed by the energization of the relay 470), through the contacts 472 of a relay 474, through the Down coil 476 and the windings 478 of relay 458 is prevented because the contacts 480 of relay 454 are open.

However, if armature 430 continues up and closes switch 64 this will stop the upward drive of the motor in the Fig. 8 circuit. The reason for this is that closing switch 64 completes a circuit from lead 438, through switch 64, then through the windings of relay 450 to lead 462. This energizes relay 450 opening the front contacts 448 and closing the back contacts 449. This opening of front relay contacts 448 breaks the circuit to the Up coil 460 which circuit has been maintained (up to this time) by the fused-closed switch 62. Upward motor operation is thus stopped, and at the same time closing the back contacts 449 of relay 450 energizes the Down coil 476 and initiates downward motor operation through the following circuit; lead 438, back contacts 449 of energized relay 450, front contacts 472 of relay 474 (which is de-energized because switch 66 is open), Down coil 476, windings 478 of relay 458, contacts 480 of relay 454 (which is deenergized because front contacts 448 of relay 450 are open), and lead 462. This downward operation of the motor continues even after switch 64 opens because switch 60 is still closed and the following circuit through the Down coil are still maintained until switch 60 opens: lead 438, switch 60, the windings of relay 470; lead 438, contacts 468 of relay 470, contacts 472 of relay 474, Down coil 476, windings 478 of relay 458, contacts 480 of relay 454, and lead 462.

When switch 60 opens the armature 430 has returned to its proper position with respect to the rack 428, but since switch 62 is fused closed, as soon as switch 60 opens contacts 456 of relay 458 close and the Up coil is re-energized. Hence the motor will drive the nut member 414 alternately up and down until the light and bell combination 479 has attracted the attention of an operator and the repair to switch 62 is made.

Figures 9, 10:
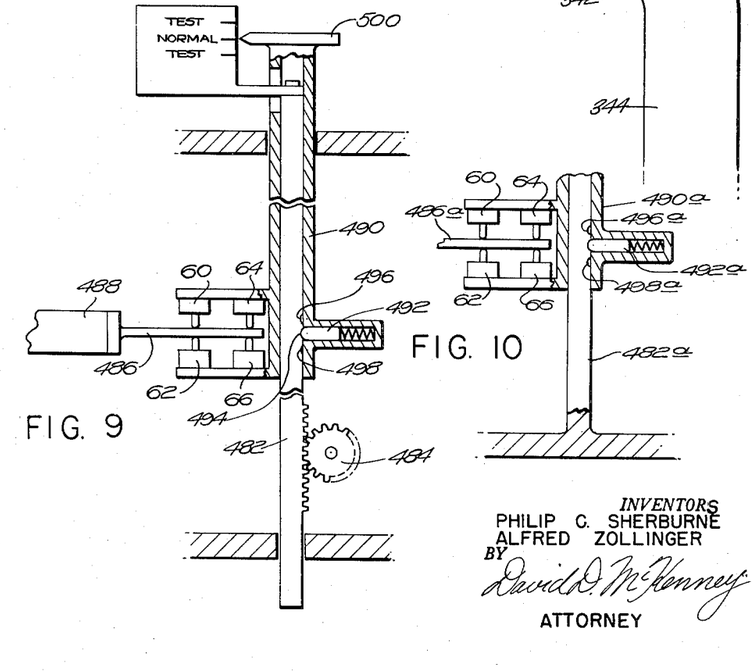
Figures 9 and 10 are diagrammatic side elevation views of other embodiments of the invention.

Figure 9 illustrates that a test of the operability of a motor hanger or motor positioner can be accomplished within this invention by actuating the same switches which respond to pipe temperature changes during normal operation rather than by actuating special test switches such as the switches 142 and 144 in Fig. 1.

Thus Fig. 9 shows a general arrangement of switches 60, 62, 64 and 66 like that of Fig. 7 wherein a rack 482 carrying these switches is moved by a selsyn gear 484 to move the switches relative to an armature 486 secured to the nut member 488 of a force exerting unit. In this Fig. 9, however, the switches are mounted on a cylinder 490 slidable on the upper end of the rack 482 and normally held in the position shown by a spring-loaded plunger 492 engaging a detent 494 in the rack. There are two additional detents 496 and 498 above and below detent 494, and the cylinder can be repositioned on the rack by pressing or pulling on the handle 500, such repositioning being complete when the plunger enters the new detent.

The detent 496 is so located that when the cylinder 490 is moved until the plunger 492 is in detent 496 switch 60 is actuated by armature 486. This turns on the motor (in a circuit like Fig. 8) to drive the nut member 488 and armature 486 downwardly until the switch 60 again opens. This test will have relocated the nut member downward by the distance between detents 494 and 496 which is preferably only a little bit more than the off-on differential of switch 60. The operation of the switch 60 and of the motor is noted during the test by lamps like those shown in Fig. 8. The test would usually be completed by lifting the cylinder handle 500 to its original position. This would close switch 62 to turn on the motor and drive the nut member 488 upwardly until switch 62 opens. Switch and motor operation would again be noted by the appropriate lamps.

The same sort of testing can be done by first lifting the cylinder 490 until plunger 494 lodges in detent 498 and by then returning the cylinder to its normal position.

An indicator plate 502 cooperating with the handle 500 shows the operator the positions of the handle for the various tests.

Figure 10 shows the construction of a test arrangement similar to that of Fig. 9 but designed for those embodiments where the switches 60, 62, 64 and 66 would normally be fixed with respect to the frame 14 of the building, as in Figs. 1–3, 5 and 6. In this embodiment the lettered numerals, e.g. those followed by the letter "a," indicate parts similar to the parts of Fig. 9 having the same number, and operate in the same manner.

We claim:

1. In a system for controlling the positioning of fluid handling equipment subject to movement caused by changes in the temperature of said equipment, a motor-driven jacking device which has a fixed frame and a movable portion engaging said equipment, an electrical circuit which supplies power to said motor, said circuit including a switch member for controlling the power to said motor through said circuit and further including an armature member engaging said switch, one of said members being movable with respect to the other to actuate said switch member, means connected to said equipment and to one of said members for moving said member in response to said changes in temperature of said equipment and thereby actuating said switch member to start said motor, means in said circuit for starting said motor independently of any changes in said temperature, and means in said circuit for signalling the operation of said motor.

2. In a system for controlling positioning of fluid handling equipment subject to movement caused by changes in the temperature of said equipment, a jacking device having a frame which is adapted to be fixed and a movable portion which is adapted to engage said equipment, a motor connected to said jacking device, said motor when turned on moving said movable portion with respect to said frame, an electrical circuit for supplying power to said motor, said circuit including a switch member controlling the power to said motor through said circuit and further including an armature member which actuates said switch member when said members are moved relative to each other, one of said members being movable with respect to the other member to actuate said switch member and start said motor, means connected between a point on said equipment and said movable member for moving said movable member in response to said changes in the temperature of said equipment, whereby said changes in temperature result in motor operation and positioning of the fluid handling equipment, an additional switch member in said circuit for starting said motor independently of movement of said movable member, and a signal device in said circuit energized by operation of said motor by said additional member.

3. In a system for controlling the position of fluid handling equipment subject to movement caused by changes in the temperature of said equipment, a jacking device having a frame which is fixed and having a movable portion which engages said equipment, an electric motor coupled to said jacking device, said motor when turned on moving said movable portion with respect to said frame, an electrical circuit adapted to supply electricity to said motor, said circuit including a switch member which when closed turns on said motor and which when opened turns off said motor, an armature member which closes said switch member when there is relative movement between said members in one direction and which opens said switch member when there is relative movement between said members in the opposite direction, one of said members being movable with respect to the other member to provide said relative movement in said directions, means connected between a point on said equipment and said movable member for moving said movable member to produce one of said relative movements between said members in response to changes in the temperature of said equipment, a second switch member in said circuit by-passing said first switch member, said second switch member when closed turning on said motor independently of said first switch member, and a signal device in said circuit energized to give a signal by operation of said motor by said second switch member.

4. In a system for controlling the position of fluid handling equipment subject to movement caused by changes in the temperature of said equipment, a jacking device having a frame which is fixed and having a portion which engages said equipment and which is movable with respect to said frame, an electric motor coupled to said jacking device, said motor when turned on moving said movable portion with respect to said frame, an electrical circuit leading electricity to said motor, said circuit including a switch member which when closed turns on said motor to move said movable portion with respect to said frame and which when opened turns off said motor, an armature member which closes said switch member when there is relative movement of a predetermined amount in one direction between said members and which opens said switch member when there is relative movement of a predetermined amount in the opposite direction between said members, one of said members being movable with respect to the other to provide said relative movement, means connected between a point on said equipment and said movable member for moving said movable member to provide said relative movement at a first rate in said one direction in response to changes in the temperature of said equipment, means connected between said movable jacking device portion and said movable member for moving said movable member to provide said relative movement at a second higher rate in said opposite direction upon the turning on of said motor by the closing of said switch member, whereby the turning on of said motor by changes in the temperature of the equipment results in the prompt turning off of said motor and hence in intermittent motor operation, a second switch member in said circuit by-passing said first switch member, said second switch member when closed turning on said motor when said first switch member is open and said second switch member when opened turning off said motor when said first switch member is open, a signal device in said circuit energized to give a signal by operation of said motor by said second switch member and a second signal device in said circuit energized to give a signal by operation of said first switch member.

5. In a system for maintaining a constant support for fluid handling equipment subject to vertical movement caused by changes in the temperature of said equipment, a jacking device having a frame which is fixed and having a portion which engages said equipment and is movable with respect to said frame, an electric motor coupled to said jacking device for moving said movable portion with respect to said frame, a resilient element interposed between said equipment and said frame, said resilient element having first and second portions spaced from each other, said first element portion being moved with respect to said second element portion by said equipment movement, and electrical circuit leading electricity to said motor, said circuit including a switch which is fixed with respect to said first spring portion and which when closed turns on said motor and moves said movable jacking device portion with respect to said frame and when opened turns off said motor, an armature which is connected to said second element portion and which closes said switch when said armature moves a predetermined amount in one direction and which opens said switch when said armature moves a predetermined amount in the opposite direction, whereby upward movement of said equipment moves said armature in said one direction, and whereby downward movement of said equipment moves said armature in said opposite direction, a second switch in said circuit bypassing said first switch, said second switch when closed turning on said motor when said first switch is open, and said second switch when opened turning off said motor when said first switch is open, a signal device in said circuit energized to give a signal by operation of said motor by said second switch, and a second signal device in said circuit energized to give a signal by operation of said first switch, whereby the operability of the motor and first switch may be tested independently of movement of said equipment.

6. In a system for maintaining a constant support for fluid handling equipment subject to vertical movement caused by changes in the temperature of said equipment, a motor-driven jacking device having a frame which is fixed and having a portion which engages said equipment and is movable with respect to said frame, an electric motor coupled to said jacking device for moving said movable portion with respect to said frame, a spring interposed between said frame and said equipment, said spring having a portion which is moved with respect to said frame by said equipment movement, an electrical circuit leading electricity to said motor, said circuit including a switch member which when closed turns on said motor and moves said movable portion with respect to said frame, an armature member which closes said switch member when there is relative movement in one direction between said members and which opens said switch member when there is relative movement in the opposite direction between said members, one of said members being fixed with respect to said frame and the other member being connected to the movable portion of said spring, whereby upward movement of said equipment moves said other member to provide relative movement between said members in said one direction and whereby downward movement of said equipment moves said other member to provide relative movement between said members in said opposite direction, a second switch member in said circuit bypassing said first switch member, said second switch member when closed turning on said motor when said first switch member is open, said second switch member when open turning off said motor when said first switch member is open, a signal device in said circuit energized to give a signal by operation of said motor by said second switch member, and a second signal device in said circuit energized to give a signal by operation of said first switch member.

7. In a system for maintaining a constant support for fluid handling equipment subject to vertical movement caused by changes in the temperature of said equipment, a motor-driven jacking device having a frame which is fixed and having a portion which engages said equipment and is movable with respect to said frame, an electric motor coupled to said jacking device for moving said movable portion with respect to said frame, a spring interposed between said equipment and said frame, said spring having one end which is moved with respect to said frame by said equipment movement, an electrical circuit leading electricity to said motor, said circuit including a switch fixed with respect to said frame which when closed turns on said motor and moves said movable portion with respect to said frame and which when open turns off said motor, an armature connected to said spring end which closes said switch when said armature moves a predetermined amount in one direction and which opens said switch when said armature moves a predetermined amount in the opposite direction, whereby upward movement of said equipment moves said armature in said one direction, and whereby downward movement of said equipment moves said armature in said opposite direction, a second switch in said circuit bypassing said first switch, said second switch when closed turning on said motor when said first switch is open, and said second switch when opened turning off said motor when said first switch is open, a signal device in said circuit energized to give a signal by operation of said motor by said second switch, and a second signal device in said circuit energized to give a signal by operation of said first switch, whereby the operability of the motor and first switch may be tested independently of said equipment movement.

8. In a system for maintaining a constant support for fluid handling equipment subject to vertical movement caused by changes in the temperature of said equipment, a motor-driven jacking device having a frame which is fixed and a portion which engages said equipment and which is movable with respect to said frame, an electric motor which is coupled to said jacking device and which when turned on moves said movable portion with respect to said frame, a spring interposed between said equipment and said frame, said spring having one end which is moved at a first rate with respect to said frame by said temperature-caused vertical movement of said equipment, said spring end being moved at a second rate with respect to said frame by movement of said movable portion by said motor, an electrical circuit leading electricity to said motor said circuit including a switch fixed with respect to said frame which when closed turns on said motor and moves said movable jacking device portion with respect to said frame and which when opened turns off said motor, an armature which is connected to said spring end and closes said switch when said armature moves a predetermined amount in one direction and which opens said switch when said armature moves a predetermined amount in the opposite direction, said second predetermined rate of movement of said armature by said motor exceeding every first rate of movement of said armature by said equipment, whereby temperature-caused upward movement of said equipment moves said armature said first-mentioned predetermined amount in said one direction to turn on said motor, and whereby motor operation thus initiated moves said armature to overcome said movement in said opposite direction to produce said second mentioned predetermined amount of armature movement in said opposite direction and turn off said motor, a second switch in said circuit by-passing said first switch, said second switch when closed turning on said motor when said first switch is open, and said second switch when open turning off said motor when said first switch is open, a signal device in said circuit energized to give a signal by operation of said motor by said second switch, and a second signal device in said circuit energized to give a signal by operation of said first switch, whereby the operability of the motor and first switch may be tested independently of temperature-caused equipment movement during an off period of the motor operation.

9. In a system for controlling the position of fluid handling equipment in accordance with the temperature on said equipment, a motor-driven jacking device having a frame which is fixed and having a portion which engages said equipment at a point and which is movable with respect to said frame, an electric motor coupled to said jacking device and which when turned on moves said movable portion with respect to said frame, an electrical circuit leading electricity to said motor, said circuit including a switch member which when closed turns on said motor and moves said movable jacking device portion with respect to said frame and when opened turns off said motor, an armature member which closes said switch member when there is relative movement of a predetermined amount in one direction between said members and opens said switch member when there is relative movement of a predetermined amount in the opposite direction between said members, means connected between a point on said equipment and one of said members for moving said member to produce said relative movement in response to changes in temperature at said last-mentioned point, whereby increases in the temperature at said point produce said relative movement in said one direction and decreases in the temperature at said point produce said relative movement in said opposite direction, a second switch member in said circuit bypassing said first switch member, said second switch member when closed turning on said motor when said first switch member is open, said second switch member when open turning off said motor when said first switch member is open, a signal device in said circuit energized to give a signal by operation of said motor by said second switch member, and a second signal device in said circuit energized to given a signal by operation of said first switch member.

10. In a system for controlling the position of fluid handling equipment in accordance with changes in the temperature of said equipment, a motor-driven jacking device having a frame which is fixed and having a portion which engages said equipment and which is movable with respect to said frame, an electric motor which is coupled to said jacking device and which when turned on moves said movable portion with respect to said frame, an electrical circuit leading electricity to said motor, said circuit including a switch member which when closed turns on said motor and moves said movable portion with respect to said frame and which when opened turns off said motor, an armature member which closes said switch member when there is relative movement between said members of a predetermined amount in one direction and which opens said switch member when there is relative movement between said members of a predetermined amount in the opposite direction, one of said members being fixed with respect to said frame and the other member being movable with respect to said frame, a heat sensitive instrument which is connected to a point on said equipment and which changes its condition in response to changes in the temperature of said equipment at said point, means connecting said instrument to said movable member for moving said movable member in response to changes in the condition of said instrument, whereby increases in the temperature at said point on said equipment provide relative movement between said members in said one direction and whereby decreases in the temperature of said equipment at said point provide relative movement between said members in said opposite direction, a second switch member in said circuit by-passing said first switch member, said second switch member when closed turning on said motor when said first switch member is open, said second switch member when open turning off said motor when said first switch member is open, a signal device in said circuit energized to give a signal by operation of said motor by said second switch member, and a second signal device in said circuit energized to give a signal by operation of the said first switch member.

11. In a system for controlling the position of fluid handling equipment in accordance with the temperature of said equipment, a motor-driven jacking device having a frame which is fixed and having a portion which engages said equipment and which is movable with respect to said frame, a heat sensitive instrument connected to a point on said equipment, said instrument receiving heat from said equipment at said point and having a portion which is distorted by changes in the amount of said heat so received and which moves with respect to said frame during said distortion, an electric motor coupled to said jacking device for moving said movable portion with respect to said frame, an electrical circuit leading electricity to said motor, said circuit including a switch member which when closed turns on said motor to move said movable jacking device portion with respect to said frame and which when opened turns off said motor, an armature member which closes said switch member when there is relative movement of a predetermined amount in one direction between said members and which opens said switch member when there is relative movement of a predetermined amount in the opposite direction between said members, one of said members being movable with respect to the other to provide said relative movements in said two directions, means connected between the movable portion of said instrument and said movable member for moving said movable member to provide said relative movement in response to changes in the temperature of said equipment at said point, whereby an increase in the temperature of said equipment at said point provides relative movement between said members in said one direction and a decrease in the temperature of said equipment at said point provides relative movement between said members in said opposite direction, a second switch member in said circuit by-passing said first switch member, said second switch member when closed turning on said motor when said first switch member is open, said second switch member when open turning off said motor when said first switch member is open, a signal device in said circuit energized to give a signal by operation of said motor by said second switch member, and a second signal device in said circuit energized to give a signal by operation of said first switch member.

12. In a system for controlling fluid handling equipment in accordance with the temperature of said equipment, a motor-driven jacking device having a frame which is fixed and having a portion which engages said equipment and is movable with respect to said frame, a confined body of fluid which changes volume with changes in temperature, said confined body of fluid having one portion adjacent a point on said equipment and receiving heat from said equipment at said point, said confined body of fluid having another portion which engages a movable element and moves said element with respect to said frame, an electric motor coupled to said jacking device for moving the movable portion thereof with respect to said frame, an electrical circuit leading electricity to said motor, said circuit including a switch which is fixed with respect to said frame and which when closed turns on said motor to move said movable jacking device portion with respect to said frame and when opened turns off said motor, an armature which is connected to said movable jacking device portion and which closes said switch when said armature moves a predetermined amount in one direction and opens said switch when said armature moves a predetermined amount in the opposite direction, said movable element being connected to said armature and moving said armature in response to changes in the temperature of said fluid, whereby an increase in the temperature of said equipment at said point causes expansion of said fluid and movement of said armature in said one direction, and whereby a decrease in the temperature of said equipment at said point results in contraction of said fluid and movement of said armature in said opposite direction, the rate of movement of said armature caused by the movement of said movable jacking device portion by said motor exceeding every rate of movement of said armature caused by expansion of said fluid, whereby turning on of said motor by the expansion of said fluid produces a follow-up motion of said armature which promptly turns said motor off and thereby produces intermittent motor operation, a second switch in said circuit bypassing said first switch, said second switch when closed turning on said motor when said first switch is open, said second switch when open turning off said motor when said first switch is open, a signal device in said circuit energized to give a signal by operation of said motor by said second switch, and a second signal device in said circuit energized to give a signal by operation of said first switch.

13. In a system for controlling the position of fluid handling equipment in accordance with changes in the temperature of said equipment, a motor-driven jacking device having a frame which is fixed and having a portion which engages said equipment and is movable with respect to said frame, an electric motor which is coupled to said jacking device and which when turned on moves said movable portion with respect to said frame, an electrical circuit leading electricity to said motor, said circuit including a switch member which when closed turns on said motor and moves said movable portion with respect to said frame and which when opened turns off said motor, an armature member which closes said switch member when there is relative movement between said members of a predetermined amount in one direction and which opens said switch member when there is relative movement between said members of a predetermined amount in the opposite direction, one of said members being fixed with respect to said frame and the other member being movable with respect to said frame, a differential mechanism connected to two spaced apart points on said equipment and to said movable member, said differential mechanism moving said movable member with respect to said fixed member when the orientation of said points with respect to each other changes and holding said movable member against movement when said orientation remains unchanged, whereby one change in said orientation provides relative movement between said members in said one direction and the opposite change in said orientation provides relative movement between said members in said opposite direction, a second switch member in said circuit bypassing said first switch member, said second switch member when closed turning on said motor when said first switch is open, said second switch when open turning off said motor when said first switch is open, a signal device in said circuit energized to give a signal by operation of said motor by said second switch member and a second signal device in said circuit energized to give a signal by operation of said first switch member.

14. In a system for controlling the position of fluid handling equipment in accordance with changes in the temperature of said equipment, a motor-driven jacking device having a frame which is fixed and having a portion which engages said equipment and is movable with respect to said frame, an electric motor which is coupled to said jacking device and which when turned on moves said movable portion with respect to said frame, an electrical circuit leading electricity to said motor, said circuit including a switch member which when closed turns on said motor and moves said movable portion with respect to said frame and which when opened turns off said motor, a differential pulley mechanism fastened to said equipment at two separate points, said mechanism containing a first cable running from one of said points to a gear assembly, a second cable running from the other of said points to said gear assembly, an armature having one end pivotally connected to said gear assembly about an axis, said armature being pivoted about said axis by a change in the orientation of said points with respect to each other caused by a change in the temperature of said equipment, the said pivoting of said armature closing said switch member and turning on said motor, whereby said jacking device moves said equipment in a direction and by an amount which restores the initial orientation of the two said points with respect to each other, a second switch member in said circuit bypassing said first switch member, said second switch member when closed turning on said motor when said first switch is open, said second switch when open turning off said motor when said first switch is open, a signal device in said circuit energized to give a signal by operation of said motor by said second switch member and a second signal device in said circuit energized to give a signal by operation of said first switch member.

15. In a system for controlling the position of fluid handling equipment in accordance with the temperature of said equipment, a motor-driven jacking device having a frame which is fixed and having a portion which engages said equipment and which is movable with respect to said frame, an element which is connected to a point on said equipment and which is moved by the movement of said point caused by changes in said equipment temperature, an electric motor coupled to said jacking device for moving said movable jacking device portion with respect to said frame, an electrical circuit leading electricity to said motor, said circuit including a switch member which when closed turns on said motor to move said movable jacking device portion with respect to said frame and which when open turns off said motor, an armature member which closes said switch member when there is relative movement of a predetermined amount in one direction between said members and which opens said switch member when there is relative movement of a predetermined amount in the opposite direction between said members, one of said members being movable with respect to the other to provide said relative movement in said two directions, a second element connected to the movable portion of said jacking device and movable therewith, means connected between one of said movable elements and one of said members for transmitting the motion of said element to said member, and means connecting the other of said elements to the other of said members for transmitting the motion of said other element to said other member, whereby movement of said equipment at said point caused by changes in the temperature of said equipment moves one of said members to provide relative movement in one direction between said members and turn on said motor and whereby movement of said movable jacking device portion caused by operation of said motor moves the other member to provide relative movement in the opposite direction between said members and turn off said motor, a second switch member in said circuit bypassing said first switch member, said second switch member when closed turning on said motor when said first switch is open, said second switch when open turning off said motor when said first switch is open, a signal device in said circuit energized to give a signal by operation of said motor by said second switch member and a second signal device in said circuit energized to give a signal by operation of said first switch member.

16. In a system for controlling the position of fluid handling equipment in accordance with the temperature of said equipment, a motor-driven jacking device having a frame which is fixed and having a portion which engages said equipment and which is movable with respect to said frame, a cable having one end fastened to a point on said equipment, said cable running over a pulley spaced from said equipment and having a weight fastened to the other end remote from said equipment said pulley being rotated by movement of said cable caused by movement of said equipment due to temperature changes, an electric motor coupled to said jacking device for moving said movable portion, a movable element connected to said movable portion and moved thereby with respect to said frame, an electrical circuit leading electricity to said motor, said circuit including a switch member which when closed turns on said motor to move said movable jacking device portion with respect to said frame and which when open turns off said motor, said switch member being movable with respect to said frame and having rotative means for transforming the rotation of said pulley into linear movement of said switch member with respect to said frame, an armature member which is fastened to said movable portion of said jacking device and which closes said switch member when there is relative movement of a predetermined amount in one direction between said members and opens said switch member when there is relative movement of a predetermined amount in the opposite direction between said members, a second switch member in said circuit bypassing said first switch member, said second switch member when closed turning on said motor when said first switch is open, said second switch when open turning off said motor when said first switch is open, a signal device in said circuit energized to give a signal by operation of said motor by said second switch member and a second signal device in said circuit energized to give a signal by operation of said first switch member.

17. In a system for controlling the position of fluid handling equipment in accordance with the temperature of said equipment, a motor-driven jacking device having a frame which is fixed and having a portion which engages said equipment and which is movable with respect to said frame, an electric motor which is coupled to said jacking device and which when turned on moves said movable portion with respect to said frame, an electrical circuit leading electricity to said motor, said circuit including a switch member which when closed turns on said motor and moves said movable jacking device portion with respect to said frame and when opened turns off said motor, an armature member which closes said switch member when there is relative movement of a predetermined amount in one direction between said members and opens said switch member when there is relative movement of a predetermined amount in the opposite direction between said members, means connected between a point on said equipment and one of said members for moving said member to produce said relative movement in response to changes in temperature at said point, whereby increases in the temperature at said point produce said relative movement in said one direction and decreases in the temperature at said point produce said relative movement in said opposite direction, one of said members having a portion which is movable with respect to the other member independently of any changes in temperature of said equipment, means for holding said movable portion of said member in a first normal position with respect to the other member and for temporarily holding said movable portion of said member in a test position spaced from said normal position, whereby said switch member is closed and said motor is turned on to move said movable jacking device portion when said movable portion of said member is moved from said normal position to said test position, and a signal device in said circuit energized to give a signal by operation of said motor by movement of said movable portion of said member into said test position, and a second signal device in said circuit energized to give a signal by operation of said switch member.

18. In a system for controlling the position of fluid handling equipment subject to movement caused by changes in the temperature of said equipment, a jacking device having a frame which is fixed and having a portion which engages said equipment and which is movable with respect to said frame, an electric motor coupled to said jacking device, said motor when turned on moving said movable jacking device portion with respect to said frame, an electrical circuit leading electricity to said motor, said circuit including a switch member which when closed turns on said motor to move said movable jacking device portion away from said equipment and which when opened turns off said motor, an armature member which closes said switch member when there is relative movement of a predetermined amount in one direction between said members and which opens said switch member when there is relative movement of a predetermined amount in the opposite direction between said members, one of said members being movable with respect to the other to provide said relative movement, means connected between said movable jacking device portion and said movable member for moving said movable member to provide said relative movement in said one direction upon movement of said movable jacking device portion toward said equipment and to provide said relative movement in said opposite direction upon movement of said movable jacking device portion away from said equipment, a second switch member in said circuit bypassing said first switch member, said second switch member when closed turning on said motor to move said movable jacking device portion toward said equipment, whereby closing said second switch member turns on said motor to provide relative movement between said members in said one direction and closes said first switch member, and means in said circuit for keeping the motor on in the direction in which it was turned on by said second switch member as long as said second switch member is closed and even after said relative movement between said members in said one direction closes said first switch member and turning said motor off when said second switch member is opened.

19. In a system for controlling the position of fluid handling equipment subject to movement caused by changes in the temperature of said equipment, a jacking device having a frame which is fixed and having a portion which engages said equipment and which is movable with respect to said frame, an electric motor coupled to said jacking device, said motor when turned on moving said movable jacking device portion with respect to said frame, an electrical circuit leading electricity to said motor, said circuit including a first switch member which when closed turns on said motor to move said movable jacking device portion away from said equipment and which when opened turns off said motor, an armature member which closes said switch member when there is relative movement of a predetermined amount in one direction between said members and which opens said switch member when there is relative movement of a predetermined amount in the opposite direction between said members, one of said members being movable with respect to the other to provide said relative movement, means connected between said movable jacking device portion and said movable member to provide said relative movement in said one direction upon movement of said movable jacking device portion toward said equipment and to provide said relative movement in said opposite direction upon movement of said movable jacking device portion away from said equipment, a second switch member in said circuit bypassing said first switch member, said second switch member when closed turning on said motor to move said movable jacking device portion toward said equipment, whereby closing said second switch member turns on said motor to provide relative movement between said members in said one direction and closes said first switch member, and means in said circuit responsive to the closing of said first switch member for turning off the operation of said motor which was previously initiated by the closing of said second member and which moved said movable jacking device portion toward said equipment, said means also being responsive to the closing of said first switch member for turning on the motor in the opposite direction to move said movable jacking device portion away from said equipment and turning off said motor when said first switch member is again opened.

20. In a system for controlling the position of fluid handling equipment subject to movement caused by changes in the temperature of said equipment, a jacking device having a frame which is fixed and having a portion which engages said equipment and which is movable with respect to said frame, an electric motor coupled to said jacking device, said motor when turned on moving said movable jacking device portion with respect to said frame, an electrical circuit leading electricity to said motor, said circuit including a first switch member which when closed during normal operation turns on said motor to move said movable jacking device portion away from said equipment and which when opened turns off said motor, an armature member which closes said switch member when there is relative movement of a predetermined amount in one direction between said members and which opens said switch member when there is relative movement of a predetermined amount in the opposite direction between said members, one of said members being movable with respect to the other to provide said relative movement, means connected between said movable jacking device portion and said movable member to provide said relative movement in said one direction upon movement of said movable jacking device portion toward said equipment and to provide said relative movement in said opposite direction upon movement of said movable jacking device portion away from said equipment, a second switch member in said circuit bypassing said first switch member, said second switch member when closed turning on said motor to move said movable jacking device portion toward said equipment thereby providing relative movement between said members in said one direction and causing said first switch member to close, means in said circuit for preventing electricity from being transmitted between said first switch and said motor while said second switch is closed thereby causing the continued movement of said movable jacking device portion toward said equipment, a third switch member adjacent said first switch member, said third switch member being closed by the said continued movement of said movable jacking device portion after the closure of said first switch member, and means in said circuit responsive to the closing of said third switch member for turning off the operation of said motor which was previously initiated by the closing of said second switch member and which moves said movable jacking device portion toward said equipment, said means also being responsive to the closing of said third switch member for turning on the motor in the opposite direction to move said movable jacking device portion away from said equipment and turning off said motor when said first and third switch members are again open.

21. In a system for controlling the position of fluid handling equipment subject to movement caused by changes in the temperature of said equipment, a jacking device having a frame which is fixed and having a portion which engages said equipment and which is movable with respect to said frame, a reversible electric motor coupled to said jacking device, said motor when turned on moving said movable jacking device portion with respect to said frame, an electrical circuit leading electricity to said motor, said circuit including a first switch member which when closed actuates a second switch which turns on said motor to move said movable jacking device portion one way and which when opened deactivates said second switch and said motor, an armature member which closes said first switch member when there is relative movement of a predetermined amount in one direction between said members and which opens said first switch member when there is relative movement of a predetermined amount between said members in the opposite direction, said members being movable with respect to each other to provide said relative movement, means connected to said equipment for moving one of said members thus providing relative movement in said one direction, a third switch member in said circuit, said third switch member being closed by said armature member upon movement of said armature member relative to said third switch in a direction opposite to the direction of the relative movement between said armature member and said first switch member which closed said first switch member, the closing of said third switch member actuating said second switch to reverse said motor even if said first switch is closed, thereby reversing the direction of said movable jacking device portion.

22. In a system for controlling the positioning of fluid handling equipment subject to movement caused by changes in the temperature of said equipment, a motor-driven jacking device which has a fixed frame and a movable portion engaging said equipment, an electrical circuit which supplies power to said motor, said circuit including a switch member for controlling the power to said motor through said circuit and further including an armature member engaging said switch, one of said members being movable with respect to the other to actuate said switch member, means connected to said equipment and to one of said members for moving said member in response to said changes in temperature of said equipment and thereby actuating said switch member to start said motor, means in said circuit for starting said motor independently of any changes in said temperature, means in said circuit for signalling the operation of said motor, and means in said circuit for indicating an overload condition in said motor.

References Cited in the file of this patent

UNITED STATES PATENTS 2,248,730    Wood               July 8, 1941